June 7, 1955   D. J. MacDOUGALL ET AL   2,710,365
ILLUMINATION CONTROL
Filed March 27, 1952
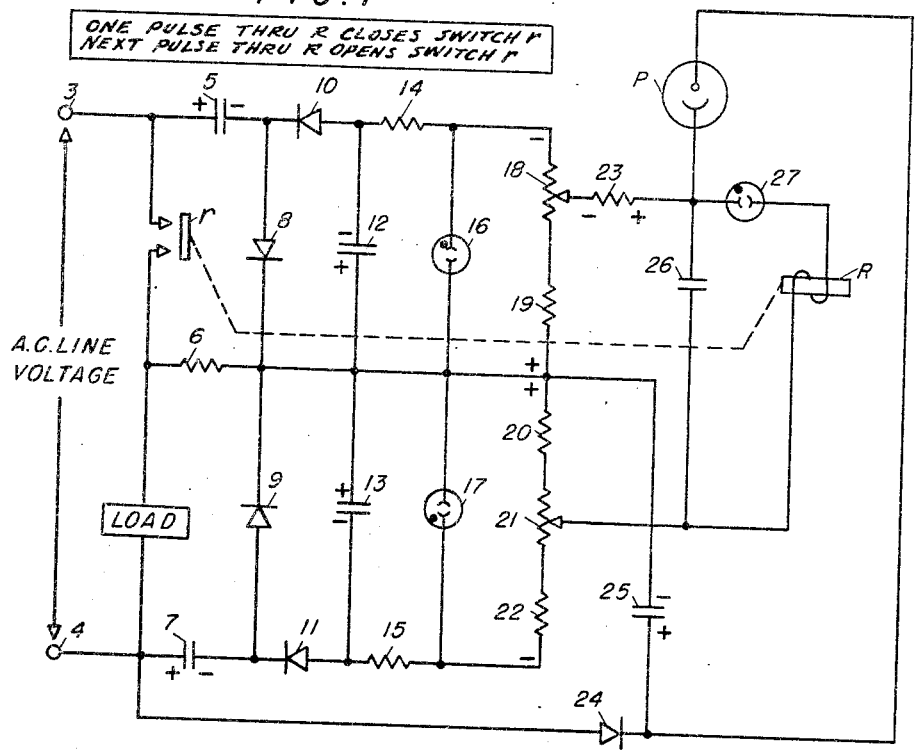
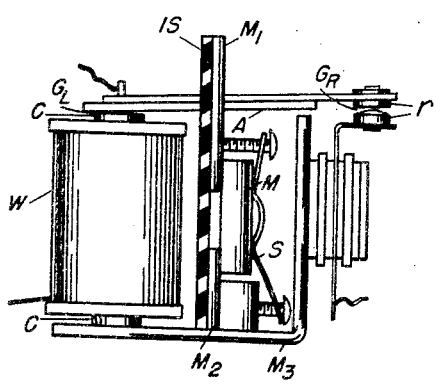
INVENTORS
D.J. MACDOUGALL
E.C.THOMSON
BY
ATTORNEY

2,710,365

ILLUMINATION CONTROL

Donald J. MacDougall, Framingham, and E. Craig Thomson, Boston, Mass., assignors to Electronics Corporation of America, a corporation of Massachusetts Application March 27, 1952, Serial No. 278,982

4 Claims. (Cl. 315—159)

This invention relates to new and improved apparatus for producing an output function in response to a change in the light intensity within a supervised volume.

The principles and structural features of the invention hereof are particularly adaptable to the design of illumination controls for automatically operating artificial light sources which supplement daylight.

An object of this invention is to generally improve illumination controls by providing for simplification componentwise, greater reliability and compactness through the use of rugged small-sized components, and economy in the power consumed through the elimination of active components such as tube filaments.

In order that the features of this invention and the mode of operation thereof may be readily understood, a detailed description follows hereinafter with particular reference being made to the drawings, wherein:

Fig. 1 is a schematic diagram of a preferred embodiment of this invention; and

Fig. 2 is a side-elevational view of the relay R which is represented schematically in Fig. 1.

In order to facilitate the understanding of the invention, the detailed description herein is confined to a typical commercial application which contemplates the operation of an artificial lighting source when daylight illumination falls below a specified intensity, and the subsequent extinguishment of said artificial lighting source when daylight illumination again exceeds a second specified value, which value may or may not be the same as said first specified value. It should be understood, however, that the principles and structure of this invention are applicable to other commercial uses.

In a practical installation of the apparatus of Fig. 1, the components thereof, with the exception of photoelectric cell P and the "Load," are located within a protective housing. An alternating-current line potential is applied to feed-through terminals 3 and 4 whereby the enclosed circuit components are energized.

The load represents any artificial lighting source such as an outdoor street lamp, or a wall lamp positioned within a room or passageway to be illuminated automatically at night. Photoelectric cell P is physically positioned so that the cathode thereof will be subjected to daylight illumination but is otherwise isolated from the artificial illumination provided by the load.

The amplitude of the photoelectric current in cell P determines the operation of pulse-actuated polarized relay R. Relay R in turn operates contact $r$ so as to control the application of the line voltage of terminals 3 and 4 to the load. A preferred embodiment of relay R is hereinafter described in detail.

The novel circuitry hereof includes two voltage doubling power supplies. The conductive direction of diodes 8, 9, 10 and 11 is in the direction of the arrow head structure of the symbols for these diodes. The first of these power supplies, comprising components 5, 6, 8, 10, 12, 14, 16, 18 and 19, supplies the energizing currents for the circuit during daylight conditions, whereas the second of these power supplies, comprising components 6, 7, 9, 11, 13, 15, 17, 20, 21 and 22, supplies the energizing currents during light demand periods. Inasmuch as closed contact $r$ shunts the input of the upper power supply, and the load, when deenergized by the opening of contact $r$, provides a low impedance shunt across the input of the lower power supply, only one of the power supplies provides an output at a given instant. If contact $r$ is closed whereby the load is energized, no output potential is developed across the upper power supply. During the time periods wherein contact $r$ is open and therefore the load is deenergized, the relatively low impedance of the load shunts the input of the lower power supply so that no output potential is developed therefrom.

If the upper power supply is operating, the power supply output potential developed across the lower tapped portion of potentiometer 18 and resistor 19 charges capacitor 26 by current flow in a path which includes resistor 23, capacitor 26, the upper tapped portion of potentiometer 21, and resistor 20. If the lower power supply is operating, the power supply output potential developed across the upper tapped portion of potentiometer 21 and resistor 20 charges capacitor 26 by current flow in a path which includes resistor 19, the lower tapped portion of potentiometer 18, resistor 23, and capacitor 26. The movable tap of potentiometer 18 is adjusted so that the potential developed across capacitor 26 by the upper power supply is sufficiently large to break down gas diode tube 27 and thereby energize relay R, whereas the movable tap of potentiometer 21 is adjusted so that the potential developed across capacitor 26 by the lower power supply is below the breakdown value for gas diode tube 27. The connection of the cathode of photoemissive cell P to the junction of resistor 23, capacitor 26 and gas diode 27 provides an additional voltage drop across load resistor 23 due to photocell current which opposes the output potential of the upper power supply or supplements the output potential of the lower power supply whereby the operation of relay R is directly responsive to illumination intensity conditions at photocell P.

Relay R is a pulse-actuated polarized relay which is operative in response to a momentary current pulse applied through gas diode 27. The use of this type of relay provides for a great economy in current consumption inasmuch as only a momentary pulse of power is consumed when it is desired to cause reversal of relay armature positions.

The preferred embodiment of relay R, as shown in Fig. 2, contemplates two magnetic meshes for the flux lines emanating from permanent magnet M. The first of these meshes, or the left mesh, comprises the upper pole of magnet M, magnetic piece $M_1$, the left portion of magnetic armature A, core C, the lower left portion of magnetic piece $M_3$, and magnetic piece $M_2$ back to the lower pole of magnet M. The second of these meshes, or the right mesh, comprises the upper pole of magnet M, magnetic piece $M_1$, the right portion of armature A, the upper and right portions of magnetic piece $M_3$, and magnetic piece $M_2$ back to the lower pole of magnet M. Insulating piece IS provides a support for separated magnetic pieces $M_1$ and $M_2$ so that the poles of permanent magnet M are not shorted one to the other. Spring S holds magnet M against magnetic pieces $M_1$ and $M_2$. Winding W comprises a solenoid having a magnetic core C whereby an electromagnet is formed. The magnetomotive force of this electromagnet is utilized to supplement or detract from the magnetomotive force of magnet M. In particular, if armature A assumes the position shown in Fig. 2, a momentary electrical pulse applied to winding W in such a direction as to cause the lines of force of core C to oppose the lines of force of magnet M in the left loop, armature A will reverse positions closing contact r. Armature A maintains the new position after the termination of the applied pulse to winding W because the closure of gap $G_R$ provides a low reluctance path through the right magnetic mesh of the magnet, whereas gap $G_L$ in the left magnetic mesh of the magnet provides a relatively high reluctance for that mesh.

If a second current pulse is now applied to winding W so as to implement the lines of force in the left mesh, the armature again assumes the position shown in the drawing until the succeeding pulse.

The detailed operation of the circuit of Fig. 1 is as follows. Initially, assuming daylight conditions, contact r is in an open position due to prior circuit operation. During the daylight period the positive alternations of line potential applied from terminal 3 to terminal 4 cause the current flow through capacitor 5, diode 8, resistor 6, and the load to charge capacitor 5 with the polarity shown in the drawing. The negative alternations of line voltage applied from terminal 3 to terminal 4, together with the series-aiding potential appearing across capacitor 5, charge capacitor 12 as marked in the drawing by current flow in a circuit which includes the load, resistor 6, capacitor 12, diode 10, and capacitor 5. In view of the voltage doubling characteristics of the network comprising components 5, 8, 10 and 12, a voltage appears across capacitor 12 which is substantially twice the peak voltage appearing between terminals 3 and 4. This potential is applied to the input of the voltage regulating network comprising resistor 14 and gas diode 16 whereby a substantially constant direct-current operating potential is developed across potentiometer 18 and resistor 19. The polarity of this potential is as marked in the drawing.

During the daylight period the load is unoperated and as a consequence the relatively low impedance thereof, which is of the order of that of a cold lamp filament, effectively shorts out the input to the voltage doubling network comprising components 7, 9, 11 and 13 whereby substantially no potential appears across elements 20, 21 and 22. The position of the movable tap of potentiometer 18 has been previously set so that the charging potential developed across capacitor 26 is sufficiently large to break down gas diode 27 were it not for the fact that the daylight radiant energy impinging upon photoelectric cell P causes a current flow through resistor 23 which drops the potential applied to capacitor 26 to a point below the breakdown potential for gas diode 27. Therefore, so long as daylight radiant energy impinges upon photoelectric cell P, the incremental voltage drop produced thereby across resistor 23 prevents the breakdown of gas diode 27 and the consequent operation of relay R.

At nightfall, or whenever the incident daylight illumination drops below a preset point as determined by the position of the movable tap of potentiometer 18, insufficient current flow through photoelectric cell P reduces the voltage drop across resistor 23 so that capacitor 26 is charged sufficiently to break down gas diode 27, thereby causing a momentary current pulse to flow through relay R. This pulse causes armature action whereby contact r is closed. The closure of contact r provides a direct short across the input of the upper power supply section whereby after a relatively short time the potential appearing across potentiometer 18 and resistor 19 is dissipated. The closure of contact r, however, applies the potential of terminal 3 directly to the upper terminal of the load whereby the load is energized. The energization of the load increases the impedance thereof, for example, in the manner characteristic of incandescent filaments, so that the effective short across the input of the lower power supply section is eliminated. Thereafter, the positive alternations appearing on terminal 4 with respect to terminal 3 charge capacitor 7 in a circuit which includes contact r, resistor 6 and diode 9. The negative alternations appearing on terminal 4 as compared with terminal 3, together with the series-aiding potential across capacitor 7, charge capacitor 13 by current flow in a circuit which includes terminal 3, contact r, resistor 6, capacitor 13, diode 11 and capacitor 7, back to terminal 4. The potential appearing across capacitor 13 is substantially twice the peak potential applied by the line to terminals 3 and 4. Resistor 15 and gas diode tube 17 provide a conventional voltage regulating function whereby a relatively smooth regulated direct-current potential appears across resistors 20, 21 and 22. The potential across resistor 20 and the upper portions of potentiometer 21 causes a reverse charging current through capacitor 26 in a circuit which includes resistor 23, the lower portion of potentiometer 18 and resistor 19. The charging potential developed across capacitor 26 is insufficient to break down gas diode 27 and cause a reversal of the armature position.

A polarizing potential is applied to the anode of photocell P at this time by means of capacitor 25. Capacitor 25 is charged with the polarity shown in the drawing by the current flow through diode 24, capacitor 25 and resistor 6.

When the daylight radiant energy impinging upon photoelectric cell P exceeds the predetermined operating point, sufficient current flows through photoelectric cell P to cause an incremental voltage drop in resistor 23 which aids the potential applied across capacitor 26 by resistor 20 and the upper portion of potentiometer 21 whereby capacitor 26 is charged sufficiently to break down gas tube 27. The resulting current pulse operates relay R and causes a reversal of the armature position so that contact r is opened thereby deenergizing the load.

The following circuit values are given by way of example only:

Capacitors 5, 7, 12, 13, and 25 __ .22 mfd., 400 volts.
Capacitor 26 _____ 4.0 mfd., 90 volts.
Rectifiers 8, 9, 10, 11, and 24 __ Selenium rectifier, 6 plates.
Resistor 6 _____ 3300 ohms, ½ watt.
Resistors 14 and 15 _____ 680K, ½ watt.
Resistors 18 and 21 _____ Potentiometer, 1.0M.
Resistor 19 _____ 1.0M, ½ watt.
Resistor 23 _____ 22M, ½ watt.
Resistors 20 and 22 _____ 470K, ½ watt.

What is claimed is:

1. A control designed to be connected to an alternating current supply having two terminals, and comprising: two rectifying circuits, each of said circuits having two input terminals and two output terminals, means to connect the input terminals of said rectifying circuits in series across the terminals of said supply, means to connect together one output terminal of each of said rectifying circuits so that their outputs are in series opposition, a resistor and a capacitor connected in series with each other to form a series circuit, means to connect said series circuit across the remaining output terminals of said rectifying circuits, a gas tube and switch-operating means connected in series to form a combination, means connecting said combination in shunt with said capacitor, means to select the outputs of said rectifying circuits so that the charge across said capacitor due to the operation of one of said rectifying circuits is less than the firing voltage of said gas tube and the charge across said capacitor due to the operation of the other of said rectifying circuits is more than the firing voltage of said gas tube, a photocell, means for passing electric current in series through said photocell and said resistor, a switch actuated by said switching means and connected across the input terminals of one of said rectifying circuits, and a load connected across the input terminals of the other of said rectifying circuits, the impedance of said load being such that the potential across said load is low with respect to the potential across said switch when said switch is open.

2. A control according to claim 1 wherein said load has a positive temperature coefficient of resistance.

3. A control according to claim 1 wherein said load is an incandescent lamp.

4. A control according to claim 1 wherein said switch operating means is a pulse-actuated self-latching polarized relay.

References Cited in the file of this patent

UNITED STATES PATENTS

| | | |
|---|---|---|
| 2,037,925 | Rentschler | Apr. 21, 1936 |
| 2,347,714 | Sorensen | May 2, 1944 |
| 2,432,084 | Blair | Dec. 9, 1947 |

FOREIGN PATENTS

| | | |
|---|---|---|
| 332,616 | Italy | Dec. 3, 1935 |